United States Patent [19]

Fourcroy et al.

[11] Patent Number: 5,361,392
[45] Date of Patent: Nov. 1, 1994

[54] DIGITAL COMPUTING SYSTEM WITH LOW POWER MODE AND SPECIAL BUS CYCLE THEREFOR

[75] Inventors: Antone L. Fourcroy; Mark W. McDermott; John P. Dunn; Bradley G. Burgess, all of Austin, Tex.

[73] Assignee: Motorola, Inc., Schaumburg, Ill.

[21] Appl. No.: 33,992

[22] Filed: Mar. 19, 1993

Related U.S. Application Data

[63] Continuation of Ser. No. 269,344, Nov. 10, 1988, abandoned.

[51] Int. Cl.$^5$ .............. G06F 9/30; G06F 9/46; G06F 13/24; G06F 11/20
[52] U.S. Cl. .............. 395/800; 364/229.5; 364/240.8; 364/241.2; 364/241.5; 364/241.4; 364/242.9; 364/244.7; 364/247.6; 364/259; 364/259.7; 364/259.9; 364/263.2; 364/DIG. 1; 364/DIG. 2; 395/725; 395/650; 395/275; 395/550
[58] Field of Search .............. 395/800, 725, 200, 250, 395/375, 325, 275, 750, 500, 550, 650; 364/DIG. 1, DIG. 2; 340/825.5

[56] References Cited

U.S. PATENT DOCUMENTS

| | | | |
|---|---|---|---|
| 4,200,912 | 4/1980 | Harrington et al. | 395/725 |
| 4,438,489 | 3/1984 | Heinrich et al. | 395/725 |
| 4,443,845 | 4/1984 | Hamilton et al. | 364/200 |
| 4,479,191 | 10/1984 | Nojima et al. | 364/900 |
| 4,590,553 | 5/1986 | Noda | 364/200 |
| 4,615,005 | 9/1986 | Maejima et al. | 364/200 |
| 4,630,041 | 12/1986 | Casamatta et al. | 340/825.5 |
| 4,644,547 | 2/1987 | Vercellotti et al. | 371/69 |
| 4,748,559 | 5/1988 | Smith et al. | 364/200 |
| 4,758,945 | 7/1988 | Remedi | 364/200 |
| 5,163,152 | 11/1992 | Okamoto | 395/725 |

OTHER PUBLICATIONS

Illustrated Dictionary of Microelectronics And Microcomputers R. C. Holland, Pergamon Press Ltd., GB, 1985, pp. 76–77.

*Primary Examiner*—Alyssa H. Bowler
*Assistant Examiner*—Daniel H. Pan
*Attorney, Agent, or Firm*—Robert L. King; Jonathan P. Meyer

[57] ABSTRACT

A digital computing system having a low power mode of operation includes a mechanism for communicating, prior to entering the low power mode, information determinative of which events shall be capable of causing the termination of the low power mode. An integrated circuit microcomputer enters a low power mode in response to executing an LPSTOP instruction. Only reset events and those interrupt events having a priority level sufficiently high to pass an interrupt mask are capable of causing the termination of the low power mode. The LPSTOP instruction causes immediate data to be loaded into a status register, resetting the interrupt mask bits. The interrupt mask is then written, by means of a special bus cycle, into an interrupt mask register in a sub-system within the microcomputer. This subsystem then shuts down the clock signals to the remainder of the microcomputer, leaving only this sub-system active. The active sub-system performs a comparison of the priority levels of received interrupt requests to the interrupt mask during the low power mode. Only if the priority level of an interrupt is sufficiently high are the clock signals resumed, thus terminating the low power mode.

4 Claims, 3 Drawing Sheets

DIGITAL COMPUTING SYSTEM WITH LOW POWER MODE AND SPECIAL BUS CYCLE THEREFOR

This application is a continuation of prior application Ser. No. 07/269,344, filed on Nov. 10, 1988 now abandoned.

FIELD OF THE INVENTION

The present invention relates, in general, to a digital computing system having a low power mode. More particularly, the invention relates to a digital computing system which prepares to enter a low power mode by broadcasting status information relating to the conditions for exit from the low power mode.

BACKGROUND OF THE INVENTION

Digital computing systems, in particular integrated circuit computing systems, commonly have the ability to enter a low power mode during which time no processing is accomplished and various subsystems are shut down to reduce power consumption. It is common to provide that the occurrence of predetermined external events will "awaken" the system from its low power mode to resume normal processing.

U.S. Pat. Nos. 4,758,559 and 4,758,945, both assigned to the assignee of the present invention, disclose aspects of a digital computing system which responds to particular software instructions by entering one of two available low power modes. The described system is available as an integrated circuit designated the MC146805 from Motorola, Inc. of Austin, Tex. Either of the two available low power modes disclosed can be terminated by a reset or interrupt event. In the case of interrupt events the mask bit, which prevents certain interrupts from being recognized by the system, must be cleared in order that a maskable interrupt event will terminate the low power mode.

The above-mentioned patents describe a system which is well suited to traditional "hand-packed" integrated circuit design methodology. However, as integrated circuit computing systems move toward "modular" design methodologies in order to permit more rapid design of customized systems, some reset and interrupt control circuits may be removed from close logical and physical proximity to the central processing unit. In this case, the previously known techniques for terminating a low power mode require modification.

SUMMARY OF THE INVENTION

Accordingly, it is an object of the present invention to provide an improved digital computing system with a low power mode.

It is a further object of the present invention to provide a digital computing system in which information relating to the conditions for termination of the low power mode is communicated prior to entry into the low power mode.

Still a further object of the present invention is to provide a digital computing system of modular design in which the central processing unit and the system which determines whether to terminate a low power mode are logically separate and in which the central processing unit communicates an interrupt mask prior to entry into a low power mode.

These and other objects and advantages of the present invention are provided by a digital computing system which executes software instructions in synchronization with clock signals, an apparatus for preparing to enter a reduced energy consumption state comprising: storage means for storing information determinative of which of a plurality of events shall be capable of causing the system to terminate the reduced energy consumption state; instruction decoder means for decoding a predetermined one of the software instructions and for producing a control signal in response thereto; and bus controller means coupled to the instruction decoder means and to a communication bus for receiving the control signal from the instruction decoder means and for placing on the communication bus predetermined signals comprising the information stored in the storage means.

These and other objects and advantages of the present invention will be apparent to one skilled in the art from the detailed description below taken together with the drawings.

DETAILED DESCRIPTION OF THE INVENTION

The terms "assert", "assertion", "negate" and "negation" will be used to avoid confusion when dealing with a mixture of "active high" and "active low" signals. "Assert" and "assertion" are used to indicate that a signal is rendered active, or logically true. "Negate" and "negation" are used to indicate that a signal is rendered inactive, or logically false. In addition, the terms "set" and "clear" will be used when referring to the rendering of a status bit or similar apparatus into its logically true or logically false state, respectively.

Figure 1:
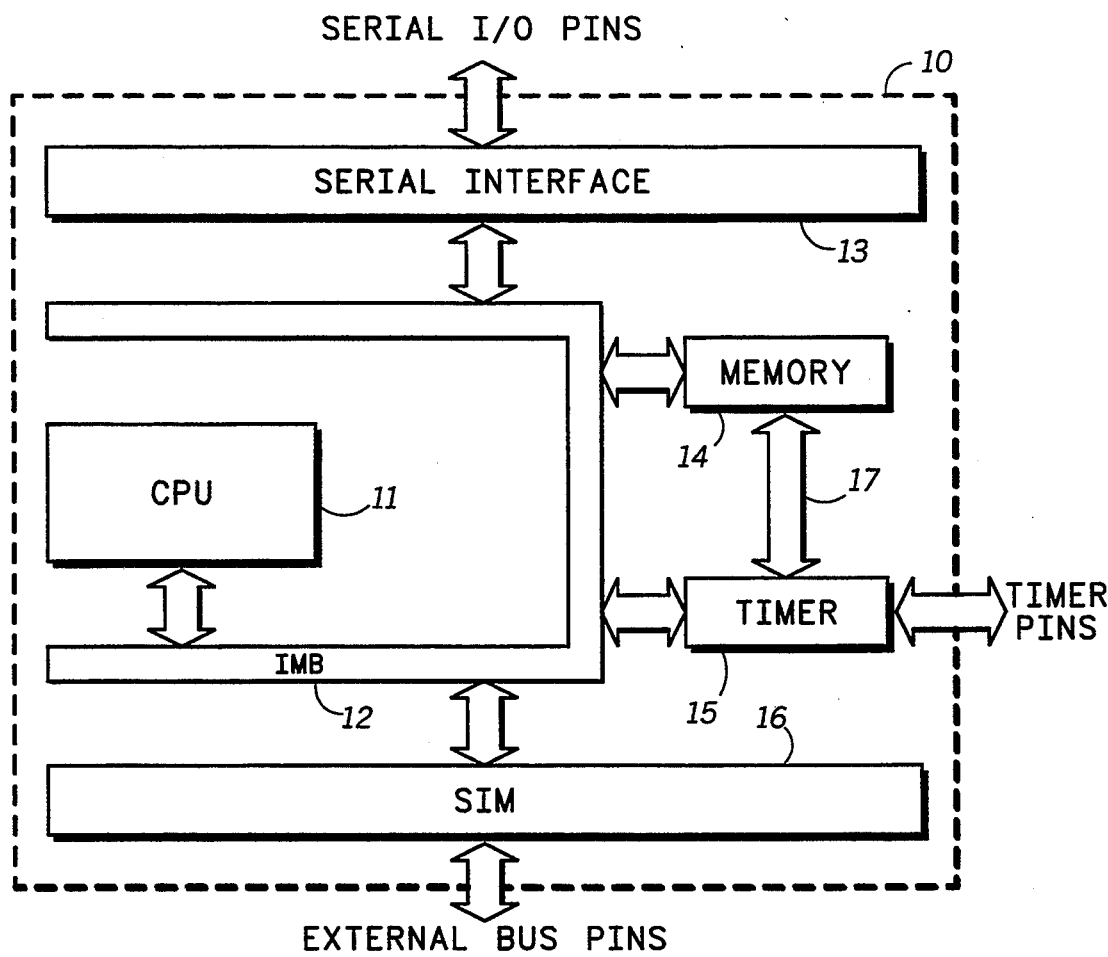
FIG. 1 is a block diagram of an integrated circuit digital computing system according to a particular embodiment of the present invention.

FIG. 1 illustrates an integrated circuit computing system according to a particular embodiment of the present invention. A microcomputer 10 comprises a central processing unit (CPU) 11, an inter-module bus (IMB) 12, a serial communication interface 13, on-board memory 14, a timer module 15 and a system integration module (SIM) 16. Inter-module bus 12, which comprises multiple data, address and control signal lines as described in detail below, is coupled to and provides for communication between each of the other components of microcomputer 10. Serial interface 13 provides for synchronous and/or asynchronous serial data transfer between microcomputer 10 and external devices and systems by means of several serial I/O pins. Memory 14 provides storage space for software instructions and other data useful to microcomputer 10. Timer module 15 provides various timing functions such as input capture, output compare and the like by means of several timer pins and is coupled to memory 14 by means of an interface 17. SIM 16 provides an interface between IMB 12 and an external bus, the details of which are discussed below, and also provides certain system functions such as clock signal generation and distribution.

The tables which appear immediately below contain the signal definitions for all of the lines of IMB 12 and the external bus which is coupled to SIM 16. Both of these buses are parallel communication buses.

TABLE I
INTER-MODULE BUS SIGNALS

| SIGNAL NAME | MNEMONIC | FUNCTION | DIRECTION |
|---|---|---|---|
| Address Bus | ADDR0–ADDR23 | 24 bit address bus | output |
| Data Bus | DATA0–DATA15 | 16 bit data bus capable of 8 and 16 bit transfers | input/output |
| Function Code | FC0–FC2 | Identifies CPU state (supervisor/user) and address space of the current bus cycle | output |
| Clock | CLOCK | Master system clock | input |
| Cycle Start | $\overline{\text{CYS}}$ | Indicates start of internal bus cycle | output |
| Address Strobe | $\overline{\text{AS}}$ | Indicates second phase of bus cycle and that address is valid | output |
| Data Strobe | $\overline{\text{DS}}$ | Indicates third phase of bus cycle and that data is valid | output |
| Read/Write | $\overline{\text{WRITE}}$ | Defines a bus cycle as a read or write, relative to the bus master | output |
| Transfer Size | SIZ0–SIZ1 | Specifies the number of bytes yet to be transferred in a bus cycle | output |
| Data Transfer Acknowledge | $\overline{\text{DTACK}}$ | Slave response which terminates a bus cycle | input |
| Bus Error | $\overline{\text{BERR}}$ | Provides for termination of a bus cycle if no valid response is received | input |
| Relinquish and Retry | $\overline{\text{RRT}}$ | Provides a means for breaking a bus mastership standoff at the internal/external bus boundary | input |
| Retry | $\overline{\text{RETRY}}$ | Provides for termination of a bus cycle which should be rerun | input |
| Halt | $\overline{\text{HALT}}$ | Indicates that the CPU has halted due to an abnormal condition | output |
| Breakpoint Request | $\overline{\text{BKPT}}$ | Signals a request for a breakpoint on the current bus cycle | input |
| Breakpoint Acknowledge | $\overline{\text{FREEZE}}$ | Indicates that the CPU has entered background debug mode | output |
| System Reset | $\overline{\text{SYSRST}}$ | Provides a "soft" reset which does not disturb system configuration data | output |
| Master Reset | $\overline{\text{MSTRST}}$ | Provides a "hard" reset of everything | input |
| Interrupt Request Level | $\overline{\text{IRQ1}}$–$\overline{\text{IRQ7}}$ | Prioritized interrupt requests to the CPU | input |
| Autovector | $\overline{\text{AVEC}}$ | Specifies that autovector feature is to be used during an interrupt ack. cycle | input |
| Bus Request | $\overline{\text{BR0}}$–$\overline{\text{BRn}}$ | Prioritized bus mastership arbitration signals | input |
| Bus Lock | $\overline{\text{BLOCK}}$ | Allows bus master to retain bus | output |
| Test Mode | $\overline{\text{TSTMOD}}$ | Enables test mode for all devices | input |
| Enable IMB test lines | $\overline{\text{IMBTEST}}$ | Changes function of IRQ1–IRQ7 to test lines | input |

Note that signal directions in the table above are specified with respect to CPU 11.

TABLE II
EXTERNAL BUS SIGNALS

| SIGNAL NAME | MNEMONIC | FUNCTION | DIRECTION |
|---|---|---|---|
| Address Bus | A0–A23* | 24 bit address bus | input/output |
| Data Bus | D0–D15 | 16 bit data bus capable of 8 and 16 bit transfers | input/output |
| Function Code | FC0–FC2* | Identifies CPU state (supervisor/user) and address | input/output |

TABLE II-continued
EXTERNAL BUS SIGNALS

| SIGNAL NAME | MNEMONIC | FUNCTION | DIRECTION |
|---|---|---|---|
| | | space of the current bus cycle | |
| Boot Chip Select | $\overline{\text{CSBOOT}}$ | Programmable chip select for boot-up | output |
| Bus Request | $\overline{\text{BR}}$* | Bus Mastership Request line | input/output |
| Bus Grant | $\overline{\text{BG}}$* | Bus Mastership Grant Line | output |
| Bus Grant Acknowledge | $\overline{\text{BGACK}}$* | Bus Mastership Grant Acknowledge line | input/output |
| Data and Size Acknowledge | $\overline{\text{DSACK0}}$–$\overline{\text{DSACK1}}$ | Indicates that data is valid on read and that data has been received on write. Also indicates port size. | input/output |
| Address Strobe | $\overline{\text{AS}}$ | Indicates that address, function codes, etc. are valid | output/input |
| Data Strobe | $\overline{\text{DS}}$ | Indicates that data is valid on write and that slave should drive data on read | input/output |
| Read/Write | WRITE | Defines a bus cycle as a read or write, relative to the bus master | input/output |
| Transfer Size | SIZ0–SIZ1 | Indicates single or multi-byte transfer | input/output |
| Bus Error | $\overline{\text{BERR}}$ | Provides for termination of a bus cycle if no valid response is received | input/output |
| Halt | $\overline{\text{HALT}}$ | Indicates that the CPU has halted due to an abnormal condition | input/output |
| Interrupt Request Level | $\overline{\text{IRQ1}}$–$\overline{\text{IRQ7}}$ | Prioritized interrupt requests to the CPU | input |
| Autovector | $\overline{\text{AVEC}}$ | Specifies that autovector feature is to be used during an interrupt ack. cycle | input/output |
| Bus Lock | $\overline{\text{BLCK}}$ | Indicates indivisible bus cycles | input/output |
| Reset | $\overline{\text{RESET}}$ | System Rest | input/output |
| External System Clock | CLK | External system clock–bus clock | output |
| Crystal Osc. | EXTAL, XTAL | Pins for connection of external oscillator or clock circuit | input/output |
| External Filter Capacitor | XFC | Allows connection of an external filter capacitor to internal clock circuit | output |
| Synthesizer Power Supply | $V_{DDSYN}$ | Provides power to internal clock synthesizer | input |
| Main Power Supply | $V_{DD}$ | Provides power to chip | input |
| Freeze | FRZ/QUOT | Acknowledges entry into background mode and outputs quotient bits in test mode | output |
| Test Mode Enable and Tri-State Control | $\overline{\text{TSTME/TSC}}$ | Enables test mode or causes output drivers to be tri-stated | input |
| Clock Mode Select | MODCK | Selects source of system clock | input |

The pins denoted above with an asterisk, the address pins A19–A23, the function code pins FC0–FC2, the bus request pin BR, the bus grant pin BG and the bus grant acknowledge pin BGACK, may also be used as programmable chip select pins. This feature of microcomputer 10 is not related to an understanding of the present invention. Signal directions are specified with respect to microcomputer 10.

Among the functions of SIM 16 is that of determining when a bus cycle initiated by CPU 11 is directed to a device external to microcomputer 10. If this is the case, SIM 16 executes an appropriate bus cycle on the external bus and also mediates between the internal bus cycle and the external bus cycle. In addition, SIM 16 is capable of displaying internal bus cycles which are directed at modules internal to microcomputer 10 via the external bus. This feature is useful for debugging and development purposes, among others.

Figure 2:
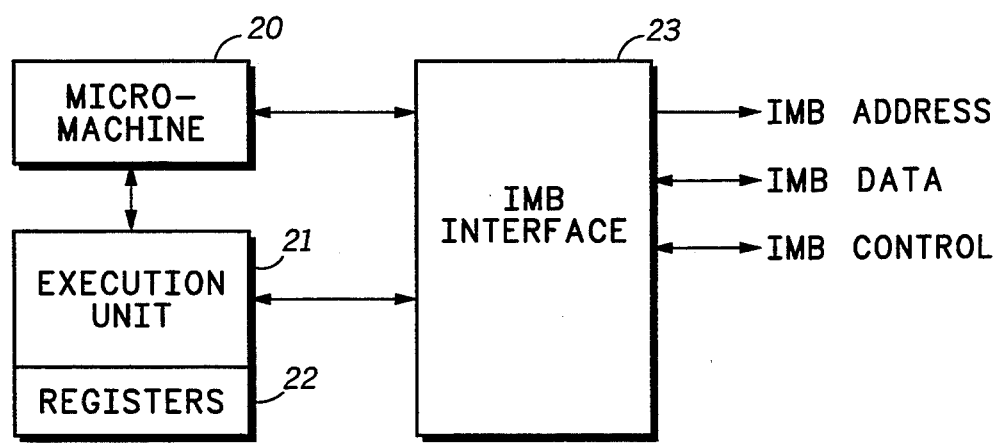
FIG. 2 is a block diagram of the central processing unit of the computing system of FIG. 1.

FIG. 2 illustrates, in very simplified form, the internal structure of CPU 11 of FIG. 1. Fundamentally, CPU 11 comprises a micro-machine 20, an execution unit 21, a set 22 of registers and a bus interface 23. Micro-machine 20 is coupled bi-directionally to interface 23 and to execution unit 21. Registers 22 and execution unit 21 are coupled to one another by means of internal buses and the like which are not illustrated here. Execution unit 21 is also bi-directionally coupled to interface 23. Interface 23 is coupled to the address, data and control signals which comprise IMB 12.

Micro-machine 20 is responsible for determining the sequence in which instructions are to be executed, receiving the instructions from interface 23 after they have been fetched from memory (either memory module 14 or external memory), instructing interface 23 to perform instruction fetches and operand read or write cycles and decoding instructions into a plurality of control signals for use in controlling execution unit 21. As a portion of the instruction sequencing function of micro-machine 20, it performs exception processing, including the function of determining whether to acknowledge interrupt requests received via interface 23 from IMB 12. Execution unit 22 is responsible for the actual execution of the logical, arithmetic and other functions encoded in the instructions received by micro-machine 20. Registers 22 store various inputs to and results of the operations of execution unit 21. IMB interface 23 is a master-only interface to IMB 12. That is, it can initiate read and write cycles of IMB 12, and it can permit another master to initiate such cycles, but it cannot respond to either a read or a write cycle of IMB 12 which is initiated by another bus master.

Figure 3:
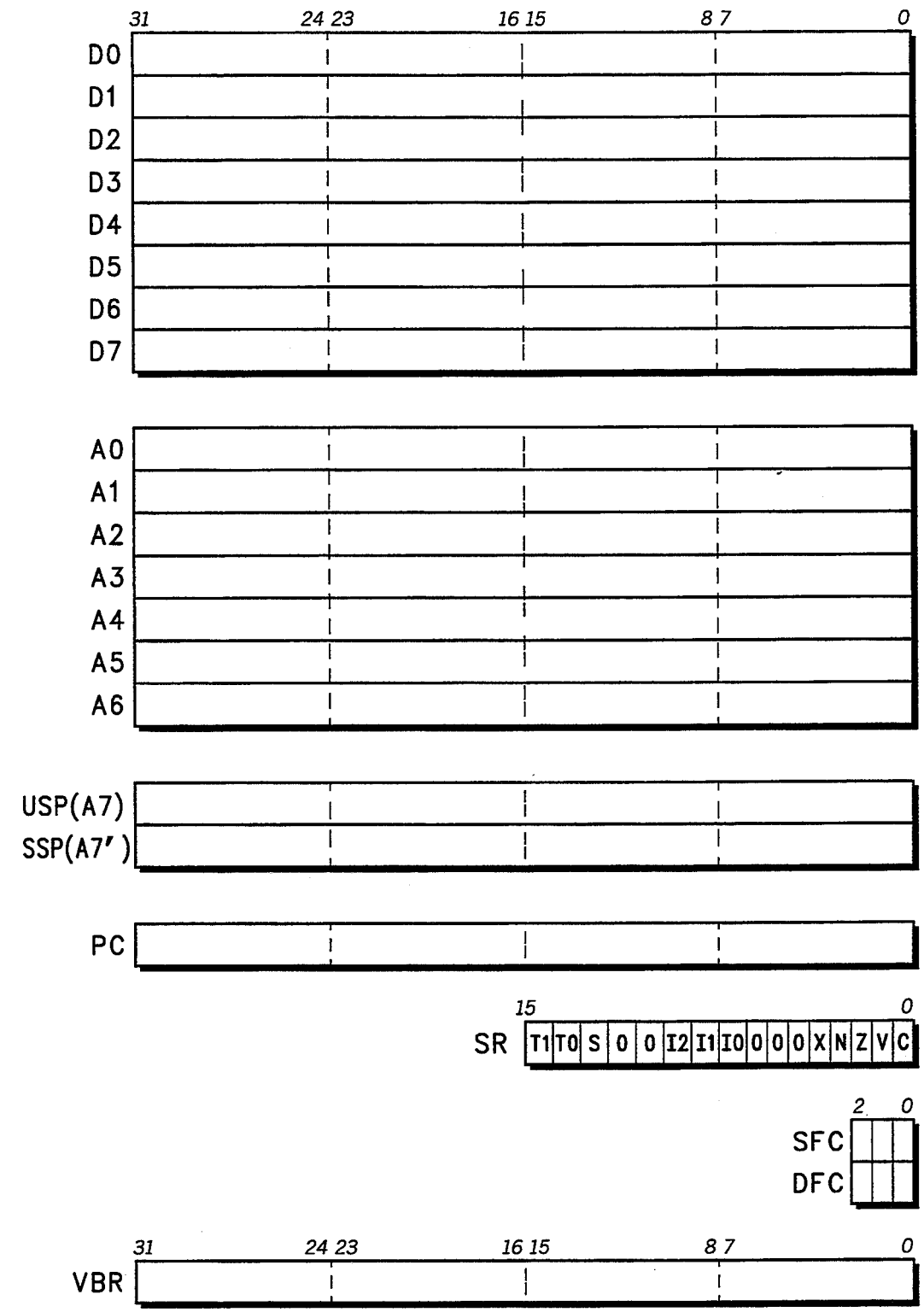
FIG. 3 illustrates the register set of the central processing unit of FIG. 2.

Referring now to FIG. 3, register 22 of FIG. 2 are illustrated in greater detail. Registers 22 comprise 8 32-bit data registers, designated D0-D7, 7 32-bit address registers, designated A0-A6, 2 stack pointers, designated USP (for user stack pointer) and SSP (for supervisor stack pointer), respectively, a single 32-bit program counter, designated PC, a single 16-bit status register, designated SR, 2 3-bit function code registers, designated SFC (for source function code) and DFC (for destination function code), respectively, and a single 32-bit vector base register, designated VBR. The two stack pointers are alternately referred to with the designations A7 and A7', respectively.

Together, registers 22 comprise what is referred to as the programmer's model of CPU 11. The programmer's model illustrated here will be familiar to any user of microprocessors of the 68000-family of microprocessors available from Motorola, Inc. of Austin Tex.

For purposes of the present invention, only bits 8-10 of the status register SR are particularly relevant. These bits, designated I0, I1 and I2, respectively, comprise an interrupt mask. These three bits, which can. encode 8 different interrupt mask settings, participate in the implementation of a prioritized interrupt recognition scheme. Basically, any interrupt source, whether internal or external, must identify its current interrupt priority level setting to CPU 11 in connection with its assertion of an interrupt request. If a requesting interrupt source has a priority level setting higher than the current mask value encoded in bits 8-10 of the status register, then the interrupt will be recognized. If the priority value is less than or equal to (except in the case of level 7 interrupts) the mask value, then the interrupt will not be recognized. Table III, below, illustrates the interrupt mask encoding scheme.

TABLE III

| \multicolumn{3}{c}{INTERRUPT MASK ENCODING} | |
|---|---|---|---|
| \multicolumn{3}{c}{MASK BITS} | MASKED INTERRUPT |
| I2 | I1 | I0 | PRIORITY LEVELS |
| 0 | 0 | 0 | none |
| 0 | 0 | 1 | 0-1 |
| 0 | 1 | 0 | 0-2 |
| 0 | 1 | 1 | 0-3 |
| 1 | 0 | 0 | 0-4 |
| 1 | 0 | 1 | 0-5 |
| 1 | 1 | 0 | 0-6 |
| 1 | 1 | 1 | 0-6 |

The priority level of an interrupt request is determined by the levels of the seven interrupt request lines $\overline{IRQ1}$-$\overline{IRQ7}$. An interrupt source having a priority setting of 7 uses $\overline{IRQ7}$ to generate an interrupt request, a source with a setting of 6 uses $\overline{IRQ6}$ to do so, and so forth.

Under normal operating conditions, all interrupts requests are communicated to CPU 11. Interrupt logic internal to CPU 11 compares the priority level of each interrupt request to its current mask setting and, if appropriate, commences an exception processing sequence.

Figure 4:
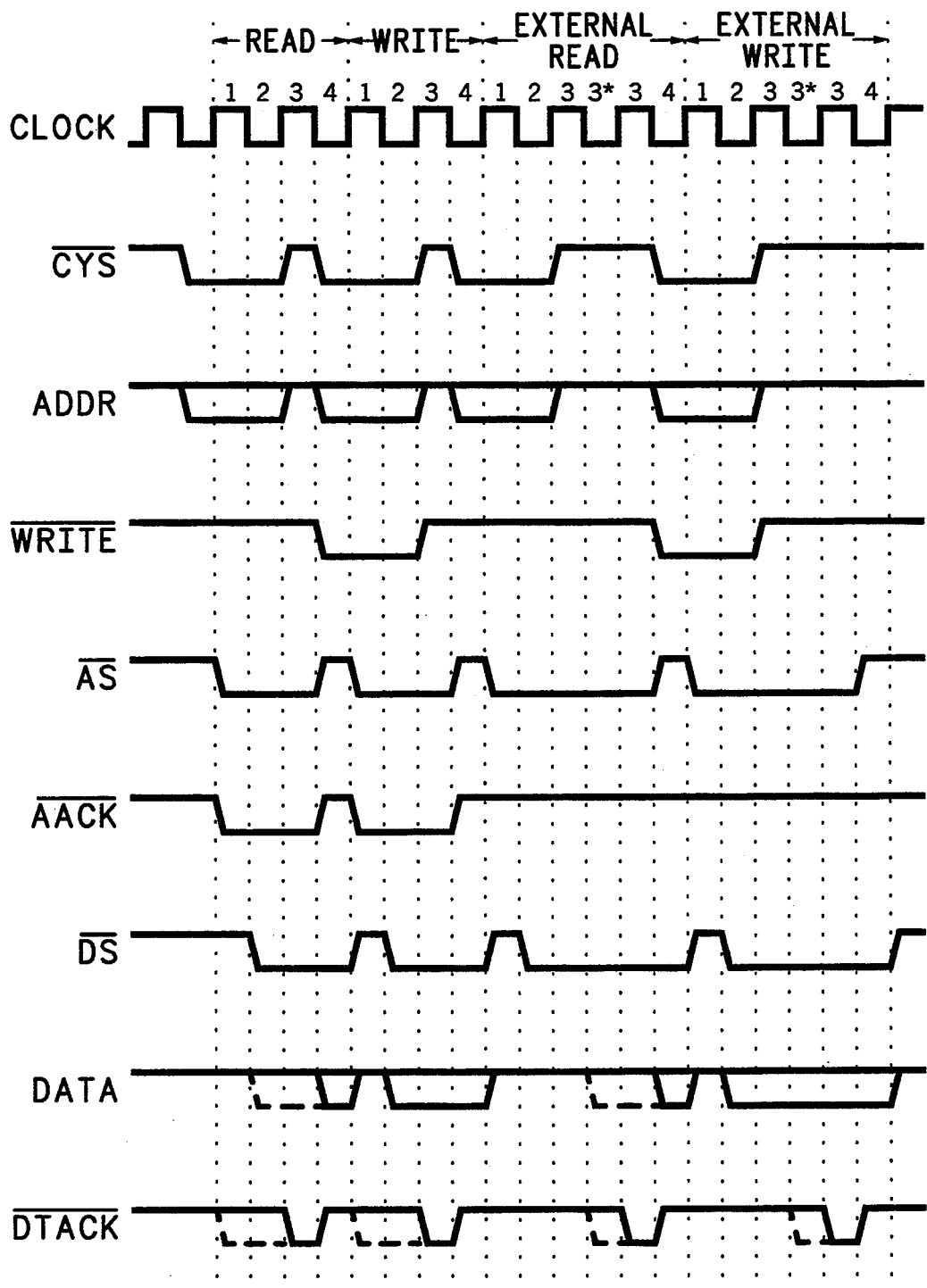
FIG. 4 is a timing diagram illustrating several bus cycles as executed by the central processing unit of FIG. 2.

The normal read and write cycles of IMB I2 will be described with reference to FIG. 4, which is a timing diagram illustrating those cycles. The signals illustrated are those of IMB 12. The cycles defined for the external bus are fundamentally similar to those described. The basic internal read and write cycles of IMB 12 (i.e., cycles directed to one of the internal modules of microcomputer 10) each take place over the span of two complete cycles of CLOCK, the master system clock signal. The four phases, or tics, of CLOCK which occur during the basic bus cycles are numbered 1-4 and correspond to four states of the bus cycles.

An internal read cycle begins with the assertion of $\overline{CYS}$ during state 4. The bus master also drives the address and function code lines at this time, as well as negating $\overline{WRITE}$. During this period, IMB 12 is precharging $\overline{AS}$, $\overline{AACK}$ and $\overline{DTACK}$.

During the next clock phase, state 1, the bus master asserts $\overline{AS}$ and the slave which is to respond to this cycle asserts $\overline{AACK}$. Also, IMB 12 precharges the data lines and $\overline{DS}$ during state 1.

At the beginning of state 2, the bus master asserts $\overline{DS}$. The slave may begin driving the data lines as early as the beginning of state 2.

The slave should respond to the bus cycle by asserting $\overline{DTACK}$ or an appropriate error signal during state 3. The master samples $\overline{DTACK}$ and the error signals at the end of state 3 and, if neither is asserted, the master inserts a wait state (referred to as 3*), then returns to state 3 to sample $\overline{DTACK}$ and the error signals again.

By the beginning of state 4, the slave must have begun driving the data lines and stops asserting $\overline{DTACK}$. This completes the basic internal read cycle.

The basic internal write cycle is very similar to the cycle described above except that $\overline{WRITE}$ is asserted in state 4 and that the bus master drives the data beginning in state 2. Otherwise, the write cycle is identical to the read cycle.

The basic external read and write cycles are fundamentally the same as the corresponding internal cycles but for the insertion of wait states (state 3*) in each cycle. This insertion is performed by SIM 16 to "hold off" the termination of the IMB cycle while the slower, external bus completes its cycle. The external bus has a five state basic cycle.

A low power mode is defined for microcomputer 10 which is initiated by the execution of a particular instruction, LPSTOP, by CPU 11. This instruction comprises three words (a total of 48 bits). The first two words contain the particular bits which identify the LPSTOP instruction (the opcode) and the third word contains immediate data. When the LPSTOP instruction is received and decoded by micro-machine 20 (FIG. 2), a number of control signals are produced which cause execution unit 21 and bus interface 23 to perform certain tasks. First, one or more control signals are produced which cause execution unit 21 to place the immediate data portion of the LPSTOP instruction into the status register SR. This has the effect of resetting the interrupt mask bits (along with the other control and condition code bits in the status register) to the values specified in the immediate data field. Next, one or more control signals are produced which cause the program counter to be incremented so as to point to the location of the next instruction to be fetched. Finally, one or more control signals are produced which cause bus interface 23 to execute a special bus cycle, the LPSTOP cycle.

The LPSTOP cycle is fundamentally a normal, internal write cycle as is described above. The LPSTOP cycle is identified as different from other write cycles by the values of the function code signals (FC0–FC2) and of certain of the address signals (A16–A19).

The function code signals identify each read or write cycle initiated by CPU 11 as being addressed to one of several possible address spaces. The various address spaces and function code signal encodings are set forth in Table IV.

TABLE IV

| FUNCTION CODE ASSIGNMENTS | | | |
|---|---|---|---|
| FC2 | FC1 | FC0 | ADDRESS SPACE |
| 0 | 0 | 0 | UNDEFINED |
| 0 | 0 | 1 | USER DATA |
| 0 | 1 | 0 | USER PROGRAM |
| 0 | 1 | 1 | UNDEFINED |
| 1 | 0 | 0 | UNDEFINED |
| 1 | 0 | 1 | SUPERVISOR DATA |
| 1 | 1 | 0 | SUPERVISOR PROGRAM |
| 1 | 1 | 1 | CPU |

For an LPSTOP cycle the function code signals are all equal to one, making it a CPU space cycle. There are several other CPU space cycles (breakpoint and interrupt acknowledge, for example), so address lines A16–A19 are used to distinguish the CPU space cycles from one another. For the LPSTOP cycle, A19 and A18 are equal to 0 and A16 and A17 are equal to 1.

The LPSTOP cycle is one example of a special register access cycle. All special register access cycles have the function code and A16–A19 encodings described above. The lower sixteen address signals specify which special register is being accessed. In the preferred embodiment, the only special register implemented is the interrupt mask register in SIM 16, which is the destination of the LPSTOP cycle. In the general case, address signals A12–A15 identify the chip, signals A8–A11 identify the module and A0–A7 identify the special register which is the target of the special register access cycle. In the preferred embodiment, signals A0–A15 are all equal to 1 for the LPSTOP cycle.

The lower three lines of the data bus (DATA0–DATA2) are used to communicate bits 8–10 of the status register (I0–I2) during the LPSTOP cycle. SIM 16 responds to the LPSTOP cycle by storing the interrupt mask bits in its interrupt mask register.

The LPSTOP cycle is intended primarily to notify internal modules that low power mode entry is imminent and to communicate the interrupt mask bits to SIM 16. However, it is possible that devices external to microcomputer 10 may also need to be notified of the coming low power mode. Therefore, if the external bus is not under the control of an external bus master when the LPSTOP cycle is executed, the LPSTOP cycle will be executed on the external bus by SIM 16, so that external devices can prepare, if necessary, for the low power mode.

In addition to storing the interrupt mask bits, SIM 16 responds to the LPSTOP cycle by halting the IMB clock signal, CLOCK. CPU 11 and all of the other internal modules of microcomputer 10 use CLOCK as the sole source of fundamental internal timing. Thus, when CLOCK is halted, all of these modules are also halted. This greatly reduces power consumption. SIM 16 continues to generate clock signals for its own use, and so remains "awake" during the low power mode. The externally-supplied clock signal, CLK, may or may not be halted during the low power mode, depending on the state of a control bit which is set within SIM 16 under control of CPU 11.

Events which can terminate the low power mode are resets (an external device holding the $\overline{\text{RESET}}$ pin low for a predetermined period of time) and interrupts which have a priority level sufficiently high not to be masked by the interrupt mask bits stored in the interrupt mask register of SIM 16. Since all of the internal modules other than SIM 16 are shut down during the low power mode, none of them can produce an interrupt signal to terminate the low power condition. However, since SIM 16 itself contains certain monitors (e.g.: watchdog timers, periodic interrupt circuits and the like) which are capable of generating interrupts, and since SIM 16 remains active during the low power mode, the interrupt which terminates the power down condition can arise within microcomputer 10. In the particular embodiment being described, of the interrupt sources within SIM 16, only the periodic interrupt circuit remains active during the low power mode. Of course, it is also possible that an external circuit will be the source of the interrupt.

During the low power mode of operation, SIM 16 simply awaits either a reset or interrupt event. Any reset event causes SIM 16 to resume the generation of the CLOCK signal and to assert the $\overline{\text{MSRST}}$ signal, thus resuming normal program execution. Any interrupt event which has a sufficiently high priority to exceed the level masked by the interrupt mask bits passed to SIM 16 by the LPSTOP cycle will also cause an exit from the low power mode. In the case of an interrupt, SIM 16 will resume generating CLOCK and also present the interrupt request to CPU 11 on the $\overline{\text{IRQ1}}$–$\overline{\text{IRQ7}}$ lines of IMB 12. CPU 11 will respond to this interrupt request as it would to any other such request, will execute appropriate exception processing routines and will return to normal program execution with the instruction which follows the LPSTOP instruction which initiated the low power mode.

Other than during the power down condition which follows the execution of the LPSTOP instruction, the interrupt mask register within SIM 16 is ignored. All internally generated interrupts are passed directly to CPU 11 via IMB 12. CPU 11 performs the comparison necessary to a determination of whether the interrupt signal will be acknowledged. All externally generated interrupts are passed by SIM 16 directly from the external bus interrupt lines to those of IMB 12 unconditionally.

The separation of the low power mode termination logic from the normal reset and interrupt logic in the CPU permits the CPU to be completely shut down during the low power mode, thus saving considerable power. Allowing the System Integration Module to perform the mask level comparison independently permits low priority interrupts to be completely ignored, obviating the need to "awaken" the CPU to perform the comparison. The present invention is not limited to the situation in which an interrupt mask setting is the critical determinant of exit from the power down mode. It may be some other conditional evaluation which the central processing unit would normally make, but which is advantageously made elsewhere in the system during a low power mode of operation. In addition, the details of the LPSTOP cycle described are not critical to the functioning of the invention. Any means of communicating the conditions by which exit from the low power mode is qualified from the central processing unit to some portion of the system which will remain active during the power down condition may be substituted for the disclosed LPSTOP bus cycle.

While the present invention has been shown and described with reference to a particular embodiment thereof, those skilled in the art will recognize various modifications to the disclosed embodiment which may be made and which are within the spirit and scope of the present invention. For instance, while the invention is disclosed in the context of a microcomputer comprising certain modules, any of these modules might be replaced by other modules having different functionality. In addition, although the central processing unit of the preferred invention is a micro-coded machine, the invention might readily be implemented in the context of a hard-wired machine. Furthermore, the particular embodiment described implements the cessation of clock signals by halting the production of those signals at their source. An alternate implementation would be to continue to produce and distribute a clock signal during the low power mode and also to produce an LPSTOP control signal which would be distributed to all internal modules. At each module, logic would respond to the LPSTOP control signal by either blocking the clock signals, thus shutting down the module, or not blocking the clock signals, thus allowing the module to continue operation during the low power mode. This alternate embodiment would entail increased power dissipation during the low power mode, but would provide increased flexibility by allowing some modules to continue operation during the low power mode.

We claim:

1. An integrated circuit computing system comprising:
   a central processing unit further comprising:
      a clock signal input terminal;
      an interrupt signal input terminal;
      first register means for storing an interrupt mask value;
      first comparator means coupled to receive a regular, periodic clock signal from the clock signal input terminal for comparing a priority level of an interrupt signal received at the interrupt signal input terminal to the interrupt mask value, the first comparator means functions only while a regular, periodic clock signal is being received at the clock signal input terminal;
      execution means for executing instructions only while a regular, periodic clock signal is received at the clock signal input terminal and for executing no instructions at all while no regular, .periodic dock signal is received at the clock signal input terminal, the execution means further comprises means for executing a first instruction and for generating a first control signal only when the first instruction is executed; and
      a bus interface means having a plurality of bus interface terminals including address terminals and data terminals, the bus interface is coupled to receive the first control signal from the execution means, the bus interface means is for placing signals indicative of the interrupt mask value onto a portion of the plurality of bus interface terminals only when the first control signal is received from the execution means;
   an internal bus having address lines coupled to the address terminals of the bus interface of the central processing unit and having data lines coupled to the data terminals of the bus interface of the central processing unit;
   an integration module having a first plurality of bus interface terminals including internal address terminals and internal data terminals coupled, respectively, to the address lines and data lines of the internal bus and having a plurality of external interface terminals for coupling the integrated circuit computing system to devices external to the integrated circuit computing system, the integration module further comprising:
      a clock signal generator means coupled to a first clock signal output terminal of the integration module, the first clock signal output terminal of the integration module is coupled to the clock signal input terminal of the central processing unit, the clock signal generator further comprises means for providing a regular, periodic clock signal to the first clock signal output terminal of the integration module and, thereby, to the clock signal input terminal of the central processing unit and for ceasing to provide the regular, periodic clock signal to the first clock signal output terminal of the integration module when the bus interface means of the central processing unit has placed the signals indicative of the interrupt mask value onto the portion of the plurality of bus interface terminals and for resuming providing the clock signal to the first clock signal output terminal of the integration module when a second control signal is received;
      second register means coupled to the first plurality of bus interface terminals of the integration module for receiving, only in response to the first control signal, the signals indicative of the interrupt mask value from the first plurality of bus interface terminals and for thereafter storing the signals indicative of the interrupt mask value;
      second comparator means for comparing a priority level of an interrupt signal to the signals stored in the second register means and for conditionally providing the second control signal to the clock signal generator based upon the outcome of comparing a priority level of an interrupt signal to the signals stored in the second register means, the second comparator means is active only after the bus interface means of the central processing unit has placed the signal indicative of the interrupt mask value onto the portion of the plurality of bus interface terminals of the central processing unit and until the second control signal has been produced.

2. An integrated circuit computing system according to claim 1 further comprising:
   at least one module having a clock signal input terminal coupled to the first clock signal output terminal of the integration module and having an interrupt signal output terminal coupled to the interrupt signal input terminal of the central processing unit.

3. An integrated circuit computing system according to claim 2 wherein the integration module further comprises:

first means for receiving an interrupt signal from one of the plurality of external interface terminals;

second means coupled to the first means for providing an interrupt signal received by the first means to the interrupt signal input terminal of the central processing unit; and third means coupled to the first means for providing an interrupt signal received by the first means to the second comparator means.

4. An integrated circuit computing system according to claim 2 wherein the integration module further comprises:

interrupt signal generation means coupled to receive a dock signal from the clock signal generator for providing an interrupt signal to the interrupt signal input terminal of the central processing unit and to the second comparator means.

* * * * *